(12) United States Patent
Takeda et al.

(10) Patent No.: US 11,452,099 B2
(45) Date of Patent: Sep. 20, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Huiling Li, Beijing (CN); Lihui Wang, Beijing (CN); Chongning Na, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 22 days.

(21) Appl. No.: 16/967,978

(22) PCT Filed: Feb. 14, 2018

(86) PCT No.: PCT/JP2018/005003
§ 371 (c)(1),
(2) Date: Aug. 6, 2020

(87) PCT Pub. No.: WO2019/159245
PCT Pub. Date: Aug. 22, 2019

(65) Prior Publication Data
US 2021/0037526 A1 Feb. 4, 2021

(51) Int. Cl.
| | | |
|---|---|---|
| H04W 72/04 | (2009.01) | |
| H04W 24/10 | (2009.01) | |
| H04W 72/02 | (2009.01) | |
| H04W 72/12 | (2009.01) | |
| H04W 88/02 | (2009.01) | |

(52) U.S. Cl.
CPC ....... *H04W 72/0453* (2013.01); *H04W 24/10* (2013.01); *H04W 72/02* (2013.01); *H04W 72/1268* (2013.01); *H04W 88/02* (2013.01)

(58) Field of Classification Search
CPC . H04W 72/0453; H04W 24/10; H04W 72/02; H04W 72/1268; H04W 88/02
See application file for complete search history.

(56) References Cited

U.S. PATENT DOCUMENTS

| | | | |
|---|---|---|---|
| 9,912,430 B2* | 3/2018 | Sayana | H04L 5/1469 |
| 2013/0121270 A1* | 5/2013 | Chen | H04L 1/0028 370/329 |
| 2014/0010126 A1 | 1/2014 | Sayana et al. | |

(Continued)

FOREIGN PATENT DOCUMENTS

| | | |
|---|---|---|
| JP | 2015-522222 A | 8/2015 |
| WO | 2016149864 A1 | 9/2016 |
| WO | 2017/048215 A1 | 3/2017 |

OTHER PUBLICATIONS

International Search Report issued in PCT/JP2018/005003 dated May 15, 2018 (1 page).

(Continued)

*Primary Examiner* — Ayanah S George
(74) *Attorney, Agent, or Firm* — Osha Bergman Watanabe & Burton LLP

(57) ABSTRACT

A user terminal, according to the present invention, has a receiving section that receives resource information, which indicates a single or a plurality of uplink control channel resources, per configuration identifier related to channel state information (CSI) reporting, and a control section that selects an uplink control channel resource to use to transmit a plurality of CSIs, based on the resource information.

5 Claims, 13 Drawing Sheets

(56) References Cited

U.S. PATENT DOCUMENTS

2016/0183244 A1   6/2016  Papasakellariou
2016/0295576 A1*  10/2016 Dinan ..................... H04B 7/04
2020/0068559 A1   2/2020  Lyu
2021/0160830 A1   5/2021  He et al.

OTHER PUBLICATIONS

Written Opinion of the International Searching Authority issued in PCT/JP2018/005003 dated May 15, 2018 (4 pages).
3GPP TS 38.331 V15.0.0; "3rd Generation Partnership Project; Technical Specification Group Radio Access Network; NR; Radio Resource Control (RRC) protocol specification (Release 15)"; Dec. 2017 (10 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
European Search Report issued in Application No. 18906071.8 dated Aug. 31, 2021.
Office Action issued in Japanese Application No. 2019-571850; dated Apr. 5, 2022 (6 pages).

\* cited by examiner

```
CSI-ReportConfig ::=                    SEQUENCE {
  reportConfigId                        CSI-ReportConfigId,
  -- Time domain behavior of reporting configuration
  reportConfigType                      CHOICE {
    periodic                            SEQUENCE {
      -- Periodicity and slot offset . Corresponds to L1
parameter 'ReportPeriodicity'and 'ReportSlotOffset'
      -- (see 38.214, section section 5.2.1.4).
      reportSlotConfig                  CHOICE {
        sl5                             INTEGER(0..4),
        sl10                            INTEGER(0..9),
        sl20                            INTEGER(0..19),
        sl40                            INTEGER(0..39),
        sl80                            INTEGER(0..79),
        sl160                           INTEGER(0..159),
        sl320                           INTEGER(0..319)
      },
      -- Indicates which PUCCH resource to use for reporting
on PUCCH.
      pucch-CSI-ResourceIndex },
    semiPersistent                      SEQUENCE {
      -- Periodicity and slot offset. Corresponds to L1
parameter 'ReportPeriodicity' and 'ReportSlotOffset'
      -- (see 38.214, section section 5.2.1.4).
      reportSlotConfig                  CHOICE {
        sl5                             INTEGER(0..4),
        sl10                            INTEGER(0..9),
        sl20                            INTEGER(0..19),
        sl40                            INTEGER(0..39),
        sl80                            INTEGER(0..79),
        sl160                           INTEGER(0..159),
        sl320                           INTEGER(0..319)
      },
      -- Indicates which PUCCH resource to use for reporting
on PUCCH.
      pucch-CSI-ResourceIndex
    },
    ...
  },
```

FIG. 1

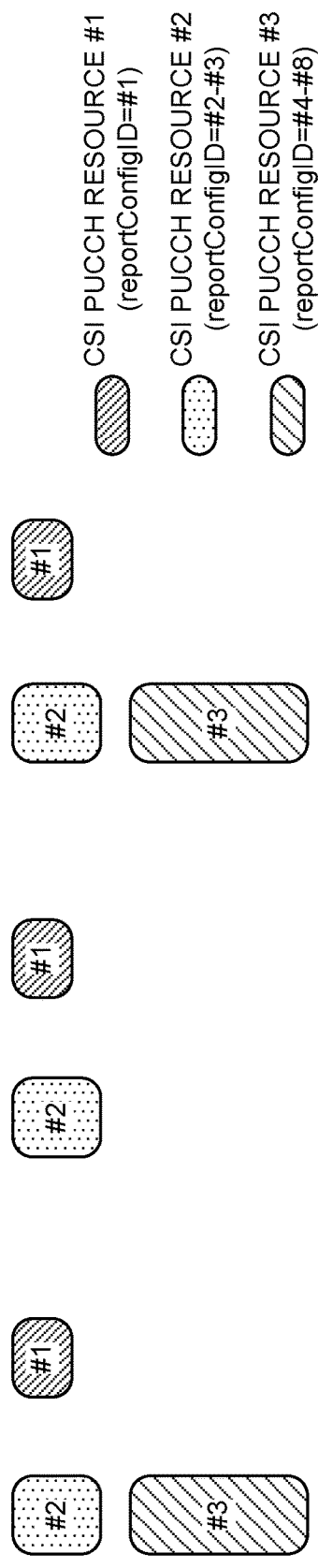
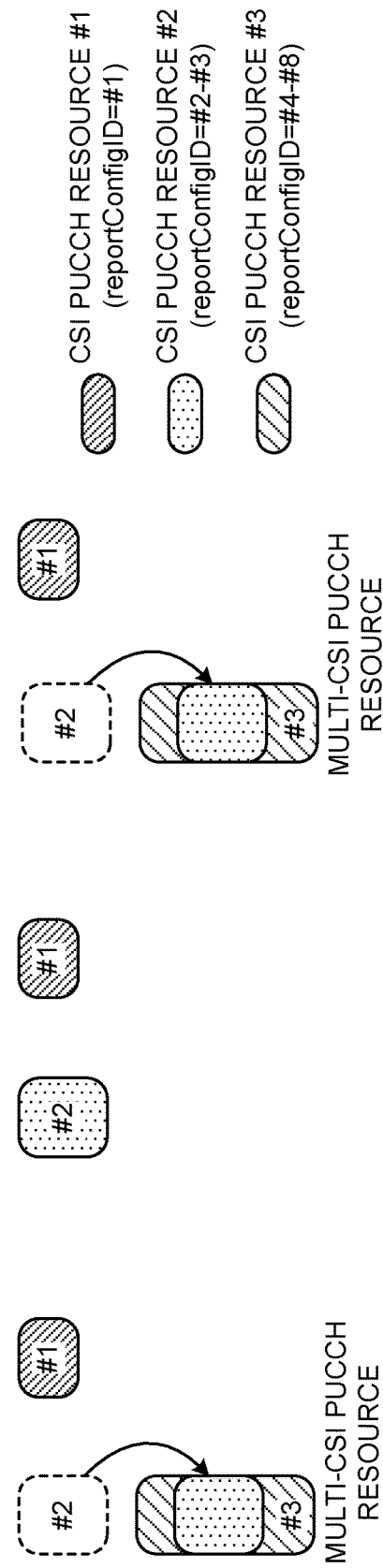

```
CSI-ReportConfig ::=                    SEQUENCE {
  reportConfigId                        CSI-ReportConfigId,
  -- Time domain behavior of reporting configuration
  reportConfigType                      CHOICE {
    periodic                            SEQUENCE {
      -- Periodicity and slot offset . Corresponds to L1
parameter 'ReportPeriodicity'and 'ReportSlotOffset'
      -- (see 38.214, section section 5.2.1.4).
      reportSlotConfig                  CHOICE {
        sl5                             INTEGER(0..4),
        sl10                            INTEGER(0..9),
        sl20                            INTEGER(0..19),
        sl40                            INTEGER(0..39),
        sl80                            INTEGER(0..79),
        sl160                           INTEGER(0..159),
        sl320                           INTEGER(0..319)
      },
      -- Indicates which PUCCH resource to use for reporting
on PUCCH.
      pucch-CSI-ResourceIndex
         pucch-CSI-Resource #1
         pucch-CSI-Resource #2
         pucch-CSI-Resource #3
    },
    semiPersistent                      SEQUENCE {
      -- Periodicity and slot offset. Corresponds to L1
parameter 'ReportPeriodicity' and 'ReportSlotOffset'
      -- (see 38.214, section section 5.2.1.4).
      reportSlotConfig                  CHOICE {
        sl5                             INTEGER(0..4),
        sl10                            INTEGER(0..9),
        sl20                            INTEGER(0..19),
        sl40                            INTEGER(0..39),
        sl80                            INTEGER(0..79),
        sl160                           INTEGER(0..159),
        sl320                           INTEGER(0..319)
      },
      -- Indicates which PUCCH resource to use for reporting
on PUCCH.
      pucch-CSI-ResourceIndex
         pucch-CSI-Resource #4
         pucch-CSI-Resource #5
         pucch-CSI-Resource #6
    },
    ...
  },
```

FIG. 5

```
CSI-ReportConfig ::=                SEQUENCE {
  reportConfigId                    CSI-ReportConfigId,
  -- Time domain behavior of reporting configuration
  reportConfigType                  CHOICE {
    periodic                        SEQUENCE {
        -- Periodicity and slot offset . Corresponds to L1
parameter 'ReportPeriodicity'and 'ReportSlotOffset'
        -- (see 38.214, section section 5.2.1.4).
        reportSlotConfig            CHOICE {
            sl5                     INTEGER(0..4),
            sl10                    INTEGER(0..9),
            sl20                    INTEGER(0..19),
            sl40                    INTEGER(0..39),
            sl80                    INTEGER(0..79),
            sl160                   INTEGER(0..159),
            sl320                   INTEGER(0..319)
        },
        -- Indicates which PUCCH resource to use for reporting
on PUCCH.
        pucch-CSI-ResourceIndex            TYPE_
            pucch-CSI-Resource #1 multi-CSI-type = true
            pucch-CSI-Resource #2 multi-CSI-type = false
            pucch-CSI-Resource #3 multi-CSI-type = true
    },
    semiPersistent                  SEQUENCE {
        -- Periodicity and slot offset. Corresponds to L1
parameter 'ReportPeriodicity' and 'ReportSlotOffset'
        -- (see 38.214, section section 5.2.1.4).
        reportSlotConfig            CHOICE {
            sl5                     INTEGER(0..4),
            sl10                    INTEGER(0..9),
            sl20                    INTEGER(0..19),
            sl40                    INTEGER(0..39),
            sl80                    INTEGER(0..79),
            sl160                   INTEGER(0..159),
            sl320                   INTEGER(0..319)
        },
        -- Indicates which PUCCH resource to use for reporting
on PUCCH.
        pucch-CSI-ResourceIndex            TYPE_
            pucch-CSI-Resource #4 multi-CSI-type = true
            pucch-CSI-Resource #5 multi-CSI-type = false
            pucch-CSI-Resource #6 multi-CSI-type = true
    },
    ...
},
```

FIG. 7

USER TERMINAL AND RADIO COMMUNICATION METHOD

TECHNICAL FIELD

The present invention relates to a user terminal and a radio communication method in next-generation mobile communication systems.

BACKGROUND ART

In the Universal Mobile Telecommunications System (UMTS) network, the specifications of long-term evolution (LTE) have been drafted for the purpose of further increasing high speed data rates, providing lower latency and so on (see non-patent literature 1). In addition, successor systems of LTE (referred to as, for example, "LTE-Advanced (LTE-A)," "Future Radio Access (FRA)," "4G," "5G," "5G+ (plus)," "New RAT (NR)," "LTE Rel. 14," "LTE Rel. 15 (or later versions)," etc.) are also under study for the purpose of achieving further broadbandization and increased speed beyond LTE.

Existing LTE systems (for example, LTE Rel. 8 to 13) support CSI reporting (periodic CSI reporting), in which a user terminal (for example, UE) periodically reports channel state information (CSI) (periodic CSI (P-CSI)), and CSI reporting (aperiodic CSI reporting), in which a user terminal reports a CSI (aperiodic CSI (A-CSI)) in response to a trigger included in downlink control information (DCI).

In periodic CSI reporting, when an uplink shared channel (Physical Uplink Shared CHannel (PUSCH)) is allocated at a timing of periodic reporting, the user terminal transmits a P-CSI using a PUSCH, and, when no PUSCH is allocated at this timing of reporting, the user terminal transmits a P-CSI using an uplink control channel (Physical Uplink Control CHannel (PUCCH)). In aperiodic CSI reporting, the user terminal transmits A-CSIs using the PUSCH scheduled by the above DCI.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 15 and later versions, 5G, 5G+, NR, etc.), studies are underway to define uplink control channel resources (also referred to as "PUCCH resources," "CSI PUCCH resources (PUCCH-CSI-Resource)," "multi-CSI PUCCH resources," etc.), in which a number of CSIs can be communicated.

Also, envisaging future radio communication systems, the user terminal is configured with one or more pieces of configuration information that relate to CSI reporting (also referred to as "reporting config information," "ReportConfig," "CSI-ReportConfig," etc.). Each reporting config information is identified by a given identifier (also referred as "configuration identifier," "reporting config ID (ReportConfigID)," etc.).

In such future radio communication systems, the problem is how to configure user terminals with uplink control channel resources for use for transmitting CSIs that correspond to each reporting config ID. If these uplink control channel resources are not configured properly, a user terminal may not be able to properly select the uplink control channel resources for use for transmitting a number of CSIs.

The present invention has been made in view of the above, and it is therefore an object of the present invention to provide a user terminal and a radio communication method, whereby uplink control channel resources for use for transmitting a number of CSIs can be selected properly.

Solution to Problem

According to one aspect of the present invention, a user terminal has a receiving section that receives resource information, which indicates a single or a plurality of uplink control channel resources, per configuration identifier related to channel state information (CSI) reporting, and a control section that selects an uplink control channel resource to use to transmit a plurality of CSIs, based on the resource information.

Advantageous Effects of Invention

According to the present invention, uplink control channel resources for use for transmitting a number of CSIs can be selected properly.

BRIEF DESCRIPTION OF DRAWINGS

FIG. 1 is a diagram to show an example of reporting config information;

FIGS. 2A and 2B are diagrams to show examples of multi-CSI PUCCH resources;

FIG. 5 is a diagram to show an example of reporting config information according to a second example of the present invention;

FIG. 7 is a diagram to show an example of resource type information according to the second example;

DESCRIPTION OF EMBODIMENTS

Figure 3:
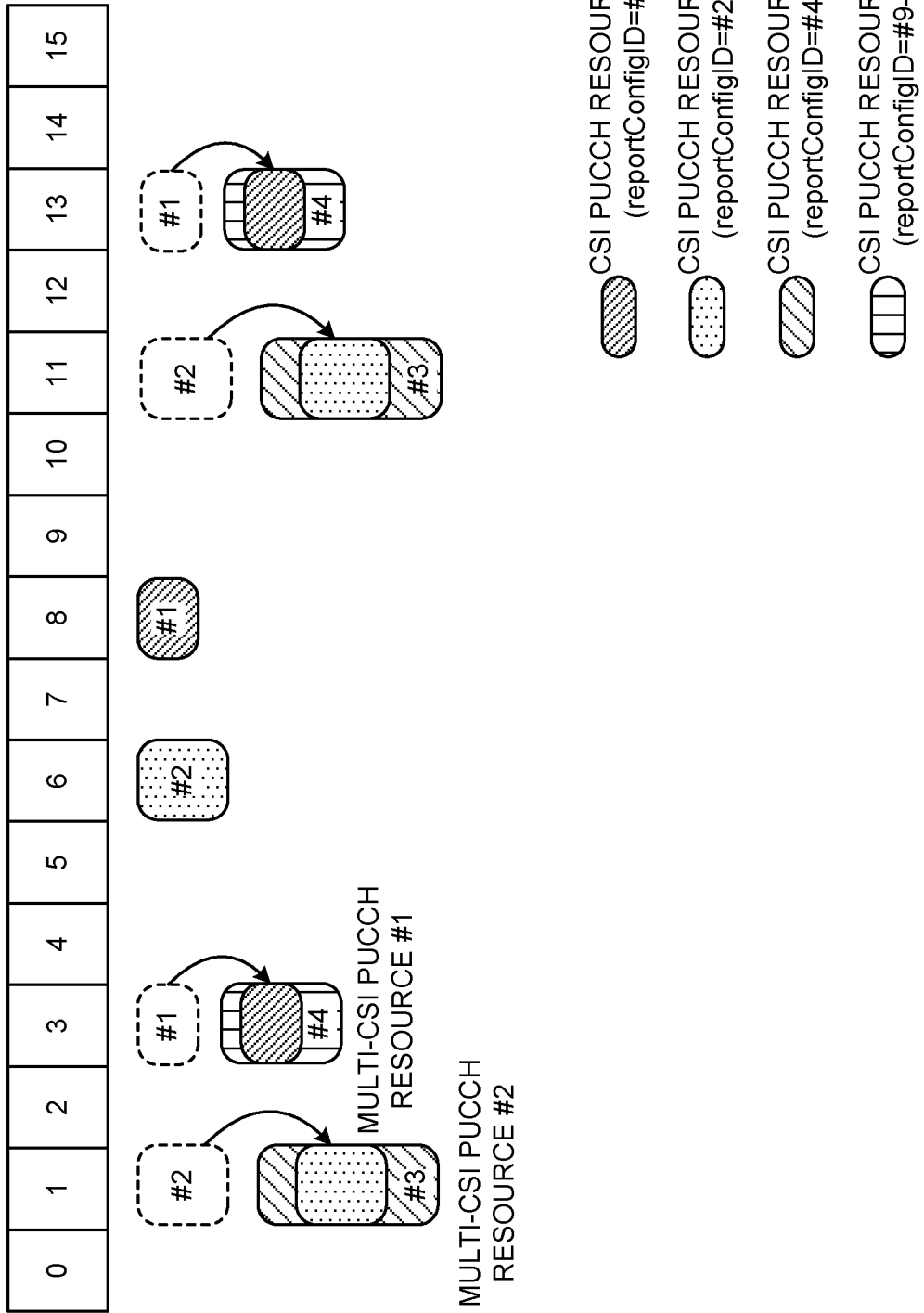
FIG. 3 is a diagram to show examples of multi-CSI PUCCH resources according to a first example of the present invention.

Envisaging future radio communication systems (for example, LTE Rel. 15 and later versions, 5G, NR, etc.), formats for an uplink control channel (for example, PUCCH) for use for transmitting UCI (also referred to as "PUCCH formats (PFs)," and/or the like) are under study. For example, LTE Rel. 15 is under research to support five types of formats, namely PF 0 to PF 4. Note that the names of PFs in the following description are simply examples, and different names may be used.

For example, PFs 0 and 1 are PFs that are used to transmit UCI of up to two bits (for example, delivery acknowledgment information (also referred to as "Hybrid Automatic Repeat reQuest-ACKnowledgment (HARQ-ACK)," "ACK or NACK," etc.), a scheduling request (SR), a multiplex of these, etc.).

PFs 2 to 4 are the PFs that are used to transmit UCI of more than two bits (for example, channel state information (CSI) (or CSI and an HARQ-ACK and/or a scheduling request (SR))). PF 2 can be allocated to one or two symbols, and therefore is also referred to as "short PUCCH" or the like. Meanwhile, PFs 3 and 4 can be allocated to four to fourteen symbols, and therefore are also referred to as "long PUCCH" and the like. In PF 3, a number of user terminals may be code-division-multiplexed (CDM) by using pre-DFT (frequency-domain) block-wise spreading.

In future radio communication systems, it is likely that at least one of periodic CSI (P-CSI) and semi-persistent CSI (SP-CSI) will be transmitted using PF 2 to 4. SP-CSI refers to CSI that is reported in CSI reporting (semi-persistent CSI reporting), which is controlled to be activated or deactivated by a radio base station (for example, a gNodeB (gNB)).

When semi-persistent CSI reporting is activated, a user terminal transmits CSI (semi-persistent CSIs (SP-CSIs)) by using PUSCH or PUCCH, in given resources of a given cycle, at given timings, until semi-persistent CSI reporting is deactivated. For example, when SP-CSI is transmitted using PUCCH, the activation or deactivation may be controlled by a MAC control element (MAC CE).

In such future radio communication systems, CSI (which may be at least one of P-CSI, SP-CSI and A-CSI) may include at least one of an indicator of channel quality (channel quality indicator (CQI)), an indicator of a precoding matrix (precoding matrix indicator (PMI)), an indicator of a resource for a reference signal (for example, a Channel State Information Reference Signal (CSI-RS)) for measuring CSI (CSI-RS resource indicator (CRI)), an indicator of the strongest layer (strongest layer indicator (SLI)), an indicator of the rank (the number of layers) (rank indicator (RI)), L1 (physical layer) reference signal received power (L1-RSRP), and so forth. CSI may be divided into a number of types (for example, type 1 and type 2).

The user terminal may be configured with (reported from the radio base station) a single piece of configuration information about the measurement and/or reporting of CSI (also referred to as "measurement config information," "MeasConfig," etc.), through higher layer signaling. Here, higher layer signaling may refer to, for example, at least one of Radio Resource Control (RRC) signaling, system information (for example, at least one of Remaining Minimum System Information (RMSI), Other System Information (OSI), Master Information Block (MIB) and System Information Block (SIB)), and broadcast information (Physical Broadcast CHannel (PBCH)).

The measurement config information may include at least one of a list of one or more configuration information related to CSI reporting (also referred to as "reporting config information," "ReportConfig," "CSI-ReportConfig," etc.) (ReportConfigList), a list of one or more pieces of configuration information related to CSI measurement resources (also referred to as "resource config information," "ResourceConfig," etc.) (MeasLinkConfigList), and a list of trigger states (ReportTrigger).

Each resource config information may include configurations of one or more resource sets, and each resource set may include at least one of CSI-RS resources (a non-zero power CSI-RS resource and a zero-power CSI-RS resource for measuring interference (CSI-IM (Interference Measurement) resource)) and a resource for use for calculating L1-RSRP (a block (also referred to as "SS/PBCH block" or "SS block," etc.) that includes at least one of a synchronization signal (SS) and a broadcast channel (Physical Broadcast CHannel (PBCH))).

Each reporting config information is associated with a bandwidth part (BWP) for downlink. Here, a BWP is a partial band configured in a wide band, and is also referred to as a "partial band." The user terminal may be configured with one or more downlink BWPs and one or more uplink BWPs.

FIG. 1 is a diagram to show an example of reporting config information. For example, as shown in FIG. 1, each reporting config information (CSI-ReportConfig or ReportConfig) may include at least one of the identifier of that reporting config information (also referred to as a "configuration identifier," a "reporting config ID (ReportConfigID)," etc.), information that indicates the type of reporting in the time domain (for example, aperiodic, semi-persistent, or periodic) (also referred to as "reporting config type information," "ReportConfigType," etc.), information that indicates at least one of the cycle of CSI reporting and the offset for the reference slot (for example, first slot #0 in a radio frame) (also referred to as "reporting slot information," "ReportSlotConfig," etc.), and information that indicates the PUCCH resource to use for CSI reporting (also referred to as "resource information," "CSI PUCCH resource information," "pucch-CSI-Resource," "pucch-CSI-ResourceIndex," etc.).

For example, in FIG. 1, when the reporting config type information (ReportConfigType) is periodic or semi-persistent, the reporting slot information (ReportSlotConfig) indicates the cycle of reporting, which may be one of 5, 10, 20, 40, 80, 160 or 320 slots, or 2, 4, 8, 16, 32, or 64 slots and so forth, and, furthermore, indicates the offset in this reporting cycle. In addition, the CSI PUCCH resource information (pucch-CSI-ResourceIndex) indicates the PUCCH resource to use to transmit the CSI corresponding to the reporting config ID.

Here, the PUCCH resource may include the value of at least one of the following parameters (these parameters may be also referred to as "fields," "information," etc.):

The symbol where the PUCCH starts being allocated (the starting symbol);
The number of symbols allocated to the PUCCH in a slot (the duration allocated to the PUCCH);
The index of the resource block (physical resource block (PRB)) where the PUCCH starts being allocated;
The number of PRBs allocated to the PUCCH;
Whether or not frequency hopping is enabled for the PUCCH;

The frequency resource of the second hop and the index of the initial cyclic shift (CS) when frequency hopping is enabled;

The index of the orthogonal spreading code (for example, OCC (Orthogonal Cover Code)) in the time domain, and the length of the OCC (also referred to as "OCC length," "spreading factor," etc.) for use for block-wise spreading before the discrete Fourier transform (DFT); and The index of the OCC for use for block-wise spreading after the DFT.

Note that, although not illustrated, the reporting config information may include information that indicates the quantity of the CSI or L1-RSRP to be reported (also referred to as "reporting quantity information," "ReportQuantity," etc.), information that indicates the granularity (example) of reporting in the frequency domain (also referred to as "reporting granularity information," "reportFreqConfiguration," etc.), and information includes a CSI configuration parameter of type 1 or type 2, which relates to a codebook (also referred to as "codebook configuration information," "CodebookConfig," etc.). The reporting granularity information may include information that indicates in which band (for example, wideband, subband, one or more contiguous or non-contiguous subbands in a BWP, etc.) CQI, PMI, or CSI is reported (cqi-FormatIndicator, pmi-FormatIndicator and csi-ReportingBand).

The user terminal may select the CSI to report, for each reporting config ID, based on at least one piece of information included in each reporting config information (for example, at least one of ReportQuantity, reportFreqConfiguration, CodebookConfi, cqi-FormatIndicator, pmi-FormatIndicator and csi-ReportingBand). The user terminal may select the PUCCH resource to use to transmit the CSI based on the CSI PUCCH resource information included in each reporting config information.

Now, in the future radio communication systems described above, it is likely that a PUCCH resource (also referred to as "CSI PUCCH resource," "multi-CSI PUCCH resource," etc.) that allows a user terminal to communicate a number of CSIs (for example, a number of P-CSIs, a number of SP-CSIs, or one or more P-CSIs and one or more SP-CSIs) will be defined.

For this multi-CSI PUCCH resource, for example, (1) a PUCCH resource, in which a number of CSIs are communicated, or (2) a single PUCCH resource, which, when the timings of a number of PUCCH resources collide, accommodates a number of CSIs that would have been communicated in these PUCCH resources, may be assumed.

FIGS. 2A and 2B are diagrams to show examples of multi-CSI PUCCH resources. FIGS. 2A and 2B show slots #0 to #15. Note that a slot is a transmission time interval (TTI) that is determined based on subcarrier spacing, and includes a given number of symbols. In FIGS. 2A and 2B, for example, M=8 holds, and the user terminal is configured with (reported) eight pieces of reporting config information (ReportConfig).

Referring to FIG. 2A, in the reporting config information of reporting config ID (ReportConfigID) #1, the reporting config type information indicates periodic reporting, the reporting slot information indicates a cycle of "five slots" and an offset of "three slots," and the CSI PUCCH resource information indicates CSI PUCCH resource #1. It then follows that, in slots #3, #8, and #13, the P-CSI of reporting config ID #1 is associated with CSI PUCCH resource #1.

Also, referring to FIG. 2A, in the reporting config information of reporting config IDs #2 and #3, the reporting config type information indicates periodic reporting, the reporting slot information indicates a cycle of "five slots" and an offset of "one slot," and the CSI PUCCH resource information indicates CSI PUCCH resource #2. It then follows that, in slots #1, #6, and #11, the P-CSIs of reporting config IDs #2 and #3 are associated with CSI PUCCH resource #2.

Also, referring to FIG. 2A, in the reporting config information of reporting config IDs #4 to #8, the reporting config type information indicates periodic reporting, the reporting slot information indicates a cycle of "ten slots" and an offset of "one slot," and the CSI PUCCH resource information indicates CSI PUCCH resource #3. It then follows that, in slots #1 and #11, the P-CSIs of reporting config IDs #4 to #8 are associated with CSI PUCCH resource #3.

In FIG. 2A, CSI PUCCH resources #2 and #3 collide in slots #1 and #11. In this case, as shown in FIG. 2B, the user terminal may map both the CSI that was planned to be transmitted in CSI PUCCH resource #2 and the CSI that was planned to be transmitted in CSI PUCCH resource #3, to CSI PUCCH resource #3, and transmit these CSIs.

CSI PUCCH resource #3 of FIG. 2B accommodates a number of CSIs that would have been communicated in CSI PUCCH resources #2 and #3, respectively, and therefore is a multi-CSI PUCCH resource.

In the future radio communication systems described above, the problem is how to configure a user terminal with CSI PUCCH resources that correspond to each reporting config ID. If these CSI PUCCH resources are not configured properly, a user terminal may not be able to select multi-CSI PUCCH resources properly.

So, the present inventors have focused on the fact that, by configuring (specifying) a user terminal with a single or a number of CSI PUCCH resources per reporting config ID, the user terminal is able to select multi-CSI PUCCH resources properly, and arrived at the present invention.

Now, the present embodiment will be described below in detail. Note that, although reporting of P-CSI will be primarily described below, the present embodiment can also be applied to reporting of other CSIs (for example, SP-CSIs).

First Example

With a first example of the present invention, a case in which a single CSI PUCCH resource is specified (configured) per reporting config ID will be described.

With the first example, when a user terminal is configured with M reporting config IDs, CSI PUCCH resources that correspond respectively to the M reporting config IDs are specified. Note that, the M reporting config IDs may all correspond to different CSI PUCCH resources, or at least one of the M reporting config IDs may correspond to overlapping CSI PUCCH resources (in the latter case, a user terminal may be configured with fewer CSI PUCCH resources than M reporting config IDs).

When M or fewer CSI PUCCH resources that correspond to M reporting config IDs are configured, N multi-CSI PUCCH resources may be defined. Here, N is less than or equal to the number of CSI PUCCH resources a user terminal may be configured with. Also, each CSI PUCCH resource configured in a user terminal may be associated with a single BWP for downlink.

FIG. 3 is a diagram to show examples of multi-CSI PUCCH resources according to the first example of the present invention. In FIG. 3, for example, M=10 holds, and the user terminal is configured with ten pieces of reporting config information identified by reporting config IDs (ReportConfigIDs) #1 to #10. In FIG. 3, CSI PUCCH resources #1 to #3 are configured in the same manner as in FIG. 1. Now, differences from FIG. 1 will be primarily described below.

For example, referring to FIG. 3, in the reporting config information of reporting config IDs #9 and #10, the reporting config type information indicates periodic reporting, the reporting slot information indicates a cycle of "ten slots" and an offset of "three slots," and the CSI PUCCH resource information indicates CSI PUCCH resource #4.

In FIG. 3, CSI PUCCH resources #2 and #3 collide in slots #1 and #11. In this case, as shown in FIG. 3, the user terminal may map both the P-CSI that was planned to be transmitted in CSI PUCCH resource #2 and the P-CSI that was planned to be transmitted in CSI PUCCH resource #3, to CSI PUCCH resource #3, and transmit these P-CSIs.

Also, CSI PUCCH resources #1 and #4 collide in slots #3 and #13. In this case, as shown in FIG. 3, the user terminal may map both the P-CSI that was planned to be transmitted in CSI PUCCH resource #1 and the P-CSI that was planned to be transmitted in CSI PUCCH resource #4, to CSI PUCCH resource #4, and transmit these P-CSIs.

In this way, in FIG. 3, CSI PUCCH resource #4 is multi-CSI PUCCH resource #1, and CSI PUCCH resource #3 is multi-CSI PUCCH resource #2.

As shown in FIG. 3, when a number of CSI PUCCH resources that correspond to different reporting config IDs collide (when a number of CSI PUCCH resources are present in the same slot), the user terminal may determine (select) a single CSI PUCCH resource (multi-CSI PUCCH resource), in which a number of CSIs that respectively correspond to these CSI PUCCH resources are communicated, according to a given rule.

The given rule may be determined based on at least one of the capacities and the starting symbols of these CSI PUCCH resources, and the priorities of these CSIs. For example, following rule 1 or 2 may be used.

<Rule 1>

In rule 1, when a number of CSI PUCCH resources that correspond to different reporting config IDs collide, the user terminal may select a single CSI PUCCH resource to use as a multi-CSI PUCCH resource, based on the capacities of these CSI PUCCH resources.

Here, the capacity of a CSI PUCCH resource is determined by at least one of the payload size, the number of bits that can be transmitted and the coding rate. Therefore, this capacity may be replaced with "the payload size," "the number of bits that can be transmitted," "the coding rate," and so forth.

To be more specific, the user terminal may select the CSI PUCCH resource having the largest payload size and/or the lowest coding rate, amongst the colliding CSI PUCCH resources, as a multi-CSI PUCCH resource (rule 1-1).

Alternatively, the user terminal may select the CSI PUCCH resource that has the smallest payload size or the highest coding rate, and that can transmit a number of CSIs that correspond respectively to the colliding CSI PUCCH resources, as a multi-CSI PUCCH resource (rule 1-2).

For example, according to rule 1-2, when CSI PUCCH resources #1 and #2 collide and the capacity of CSI PUCCH resource #1 is larger than the capacity of CSI PUCCH resource #2, the user terminal may select CSI PUCCH resource #2 if CSI PUCCH resource #2 can communicate all the CSIs corresponding respectively to CSI PUCCH resources #1 and #2, or the user terminal may select CSI PUCCH resource #1 if CSI PUCCH resource #2 cannot communicate all of these CSIs.

<Rule 2>

In rule 2, when a number of CSI PUCCH resources that correspond to different reporting config IDs collide, the user terminal may select a single CSI PUCCH resource to use as a multi-CSI PUCCH resource, based on the starting symbol of these CSI PUCCH resources.

Figure 4A:
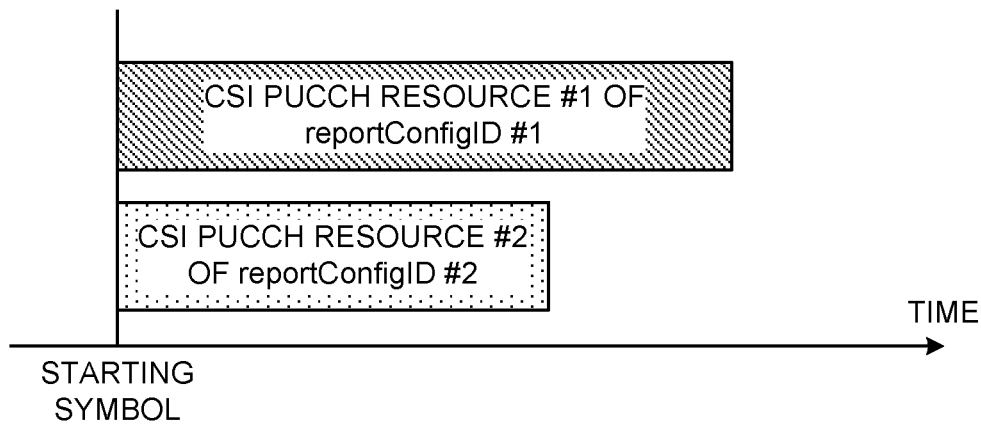
FIGS. 4A to 4C are diagrams to show examples of selection of multi-CSI PUCCH resources according to the first example.
Figure 4B:
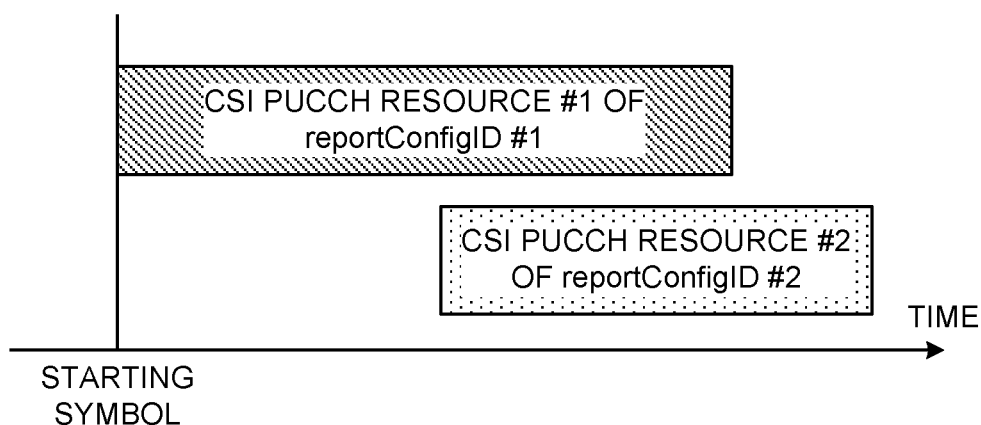
Figure 4C:
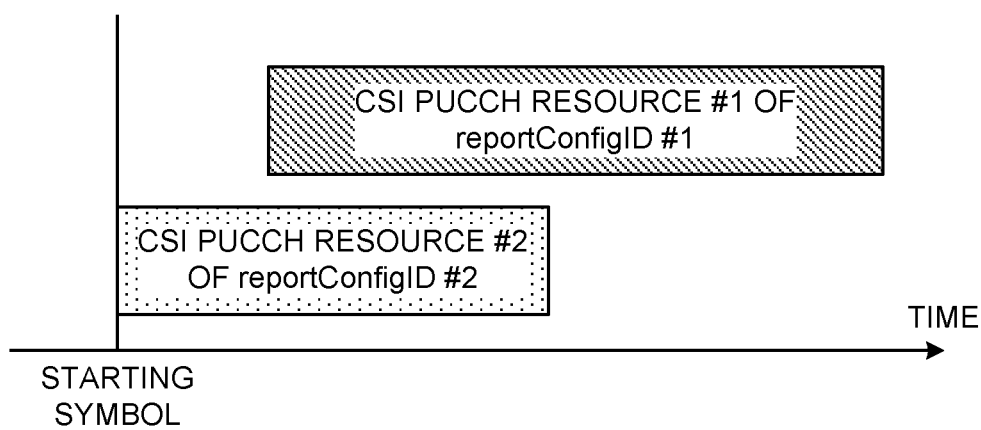

FIGS. 4A to 4C are diagrams to show examples of selection of multi-CSI PUCCH resources according to the first example. FIGS. 4A to 4C assume cases in which CSI PUCCH resource #1, which corresponds to reporting config ID #1, and CSI PUCCH resource #2, which corresponds to reporting config ID #2, collide at least partially, and in which the capacity of CSI PUCCH resource #1 is larger than the capacity of CSI PUCCH resource #2.

As shown in FIG. 4A, when CSI PUCCH resource #1 and CSI PUCCH resource #2 share the same starting symbol, the user terminal may select a single CSI PUCCH resource to use as a multi-CSI PUCCH resource, based on the capacities of CSI PUCCH resource #1 and CSI PUCCH resource #2, as explained in rule 1. For example, in FIG. 4A, CSI PUCCH resource #1 having a larger capacity than CSI PUCCH resource #2 may be selected.

As shown in FIGS. 4B and 4C, when CSI PUCCH resource #1 and CSI PUCCH resource #2 share the same starting symbol, the user terminal may select a single CSI PUCCH resource to use as a multi-CSI PUCCH resource, based on the priorities of CSIs communicated in CSI PUCCH resource #1 and CSI PUCCH resource #2.

For example, referring to FIG. 4B, the priority of the CSI to be communicated in CSI PUCCH resource #2 is configured higher than the priority of the CSI to be communicated in CSI PUCCH resource #1. In FIG. 4B, it is not possible to prepare for transmitting the CSI of CSI PUCCH resource #2 of the higher priority, in CSI PUCCH resource #1, and therefore the user terminal may select CSI PUCCH resource #2 as a multi-CSI PUCCH resource.

For example, referring to FIG. 4C, the priority of the CSI to be communicated in CSI PUCCH resource #1 is configured higher than the priority of the CSI to be communicated in CSI PUCCH resource #2. In FIG. 4C, it is not possible to prepare for reporting the CSI of CSI PUCCH resource #1 of the higher priority, in CSI PUCCH resource #2, and therefore the user terminal may select CSI PUCCH resource #1 as a multi-CSI PUCCH resource.

According to the first example, when a single CSI PUCCH resource is specified per reporting config ID, the user terminal can select multi-CSI PUCCH resources properly.

Second Example

With a second example of the present invention, a case in which a number of CSI PUCCH resources are specified per reporting config ID will be described.

With the second example, a user terminal is configured with m CSI PUCCH resources (m>1) per reporting config ID. Note that the number m of CSI PUCCH resources for each reporting config ID may be different among a number of reporting config IDs, or may be the same among at least some of these reporting config IDs.

When m CSI PUCCH resources are configured per reporting config ID, n multi-CSI PUCCH resources (n<m) may be defined amongst these m CSI PUCCH resources.

FIG. 5 is a diagram to show an example of reporting config information according to a second example of the present invention. For example, FIG. 5 is different from FIG.

1 in that the CSI PUCCH resource information (pucch-CSI-ResourceIndex) in each reporting config information (CSI-ReportConfig) indicates a number of CSI PUCCH resources.

For example, in FIG. 5, a user terminal is configured with three CSI PUCCH resources #1 to #3, as CSI PUCCH resources for use for transmitting P-CSIs. For example, a user terminal is configured with three CSI PUCCH resources #4 to #6, as CSI PUCCH resources for use for transmitting SP-CSIs.

Figure 6:
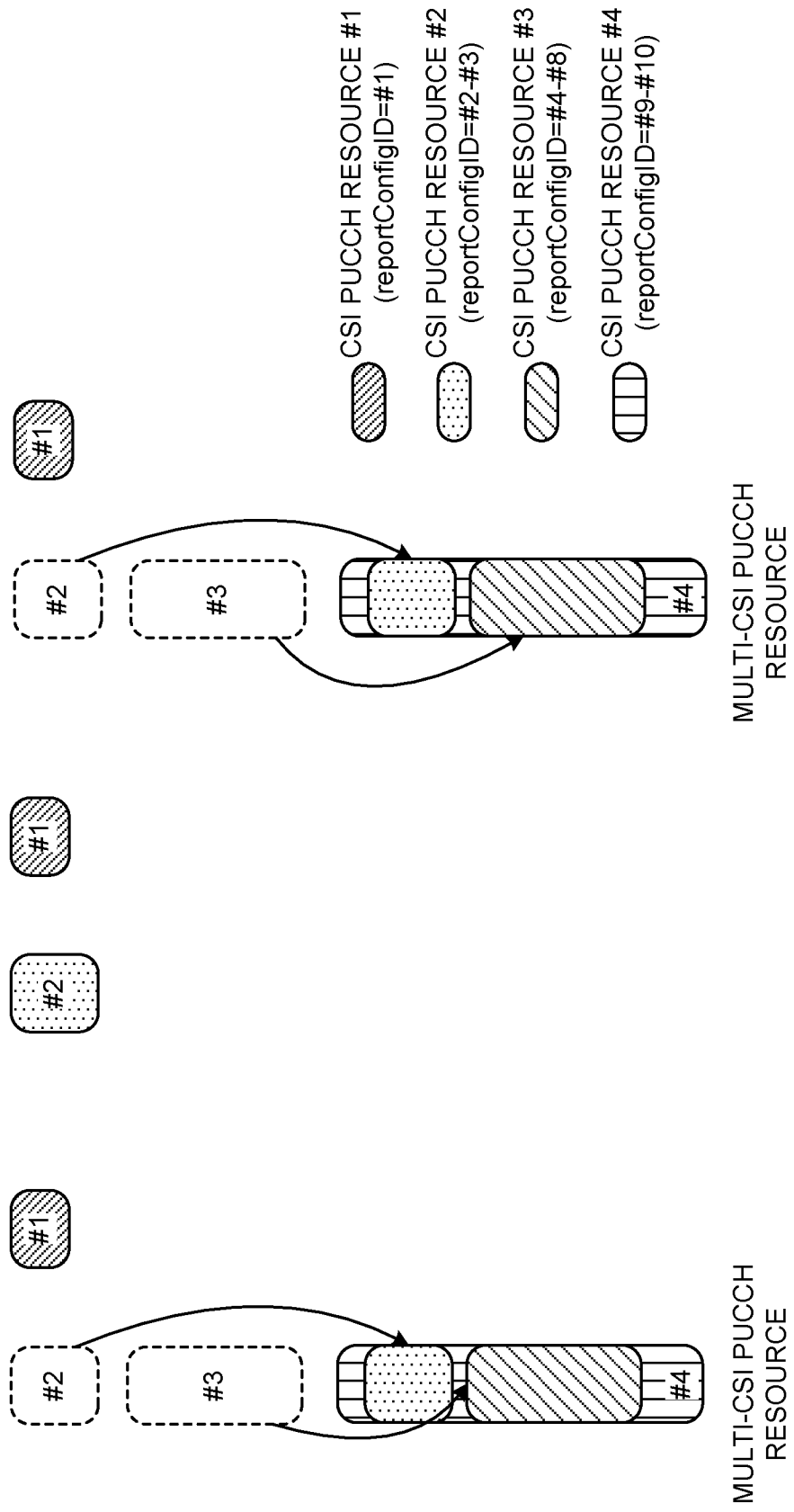
FIG. 6 is a diagram to show examples of multi-CSI PUCCH resources according to the second example.

FIG. 6 is a diagram to show examples of multi-CSI PUCCH resources according to the second example. In FIG. 6, for example, the user terminal is configured with eight pieces (M=8) of reporting config information. FIG. 6 is different from FIG. 3 in that each reporting config information of reporting config IDs #4 to #8 specifies a number of CSI PUCCH resources (here, two CSI PUCCH resources #3 and #4). Now, differences from FIG. 3 will be primarily described below.

In FIG. 6, CSI PUCCH resources #2, #3, and #4 collide in slots #1 and #11. In this case, as shown in FIG. 6, the user terminal may map all the P-CSIs that were planned to be transmitted in CSI PUCCH resource #2, #3 and #4 to CSI PUCCH resource #3, and transmit these P-CSIs. In FIG. 6, CSI PUCCH resource #4 is a multi-CSI PUCCH resource.

As shown in FIG. 6, when a number of CSI PUCCH resources that correspond to the same and/or different reporting config IDs collide, the user terminal may determine (select) a single CSI PUCCH resource (multi-CSI PUCCH resource), in which a number of CSIs that respectively correspond to these CSI PUCCH resources are communicated, according to a given rule.

According to this given rule, based on at least one of the resource types, capacities and starting symbols of these CSI PUCCH resources, and the priorities of these CSIs, the CSI PUCCH resource (multi-CSI PUCCH resource) to use to transmit these CSIs may be selected. For example, following rule 3 or 4 may be used.

<Rule 3>

According to rule 3, when the user terminal transmits a single CSI report (a CSI report corresponding to a single report ID) in the same slot, the user terminal may select the CSI PUCCH resource having the smallest payload size amongst a number of CSI PUCCH resources that collide (rule 3-1). Here, the report ID is the identifier of a CSI report, and, for example, may be the same as the reporting config ID.

Alternatively, when the user terminal transmits a single CSI report, the user terminal may select the CSI PUCCH resource based on the PUCCH format (PF) to use for the CSI report (rule 3-2). For example, when the user terminal reports a single P-CSI in this CSI report, the user terminal may select a CSI PUCCH resource of PF 2. On the other hand, when the user terminal reports a number of CSIs in this CSI report, the user terminal may select a CSI PUCCH resource of PF 3 or PF 4.

In addition, when the user terminal transmits a number of CSI reports (CSI reports corresponding to a number of report IDs) in the same slot, the user terminal may select a single CSI PUCCH resource amongst a number of CSI PUCCH resources that collide, according to above rule 1 or rule 2.

<Rule 4>

In rule 4, when a number of CSI PUCCH resources that correspond to the same and/or different reporting config IDs collide, the user terminal may select a single CSI PUCCH resource to use as a multi-CSI PUCCH resource, based on the information indicating these CSI PUCCH resources (also referred to as "resource type information," "multi-CSI-type," etc.).

FIG. 7 is a diagram to show an example of resource type information according to the second example. With reference to FIG. 7, an example in which a number of CSI PUCCH resources correspond to a single reporting config ID will be described. Also, in FIG. 7, the resource type information (multi-CSI-type) of each CSI PUCCH resource indicates whether or not each CSI PUCCH resource supports transmission of a number of CSIs (that is, whether each CSI PUCCH resource is a multi-CSI PUCCH resource or not).

For example, in FIG. 7, the resource type information (multi-CSI-type=true) of CSI PUCCH resources #1 and #3 indicates a multi-CSI PUCCH resource. On the other hand, the resource type information (multi-CSI-type=false) of PUCCH-CSI #2 does not indicate a multi-CSI PUCCH resource.

The user terminal may determine (select) a single CSI PUCCH resource to use to transmit a number of CSIs, from the CSI PUCCH resources indicated as being multi-CSI PUCCH resources by the resource type information, according to one of above rule 1 to rule 3.

According to the second example, when a number of CSI PUCCH resources are specified per reporting config ID, the user terminal can select a multi-CSI PUCCH resource properly.

(Radio Communication System)

Now, the structure of a radio communication system according to the present embodiment will be described below. In this radio communication system, the radio communication methods according to the above-described embodiments are employed. Note that the radio communication methods according to the herein-contained embodiments may be each used alone, or at least two of them may be combined and used.

Figure 8:
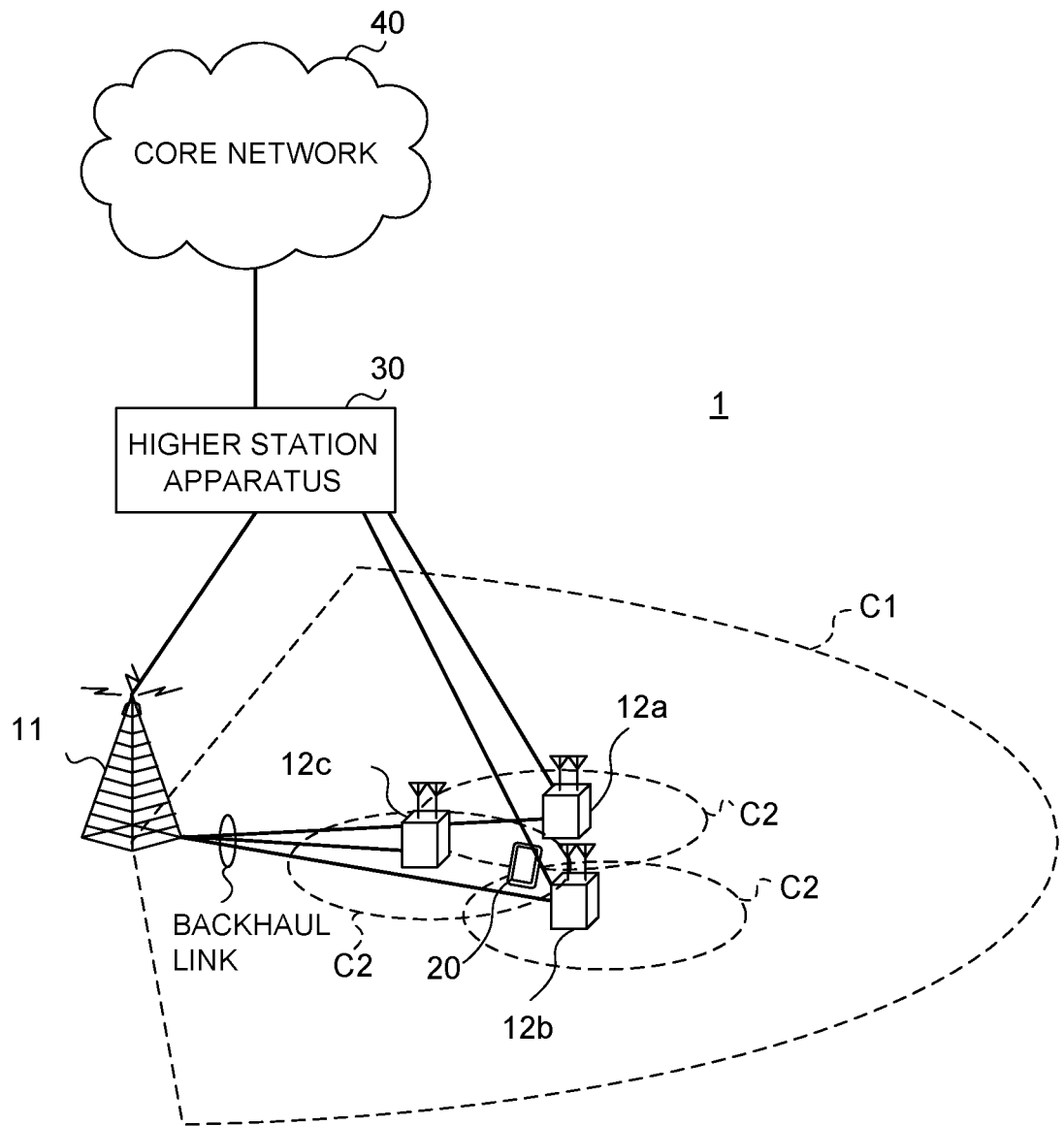
FIG. 8 is a diagram to show an exemplary schematic structure of a radio communication system according to the present embodiment.

FIG. 8 is a diagram to show an exemplary schematic structure of a radio communication system according to the present embodiment. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit. Note that the radio communication system 1 may be referred to as "SUPER 3G," "LTE-Advanced, (LTE-A)" "IMT-Advanced," "4G," "5G," "Future Radio Access (FRA)," "NR (New RAT (New Radio Access Technology))," and the like.

The radio communication system 1 shown in FIG. 8 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells/within cells may be adopted here.

Here, a numerology refers to a communication parameter in the frequency direction and/or the time direction (for example, at least one of subcarrier spacing, the bandwidth, the length of a symbol, the length of CP (CP length), the length of a subframe, the time length of a TTI (TTI length), the number of symbols per TTI, the radio frame configuration, the filtering process, the windowing process, etc.). In the radio communication system 1, for example, subcarrier spacings such as 15 kHz, 30 kHz, 60 kHz, 120 kHz and 240 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a number of cells (CCs) (for example, two or more CCs). Furthermore, the user terminals can use licensed-band CCs and unlicensed-band CCs as a number of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be used, or a number of different numerologies may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the Common Public Radio Interface (CPRI) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNodeB (eNB)," a "gNodeB (gNB)," a "transmitting/receiving point (TRP)," and so on. Also, the radio base stations 12 are radio base stations each having a local coverage, and may be referred to as "small base stations," "micro base stations," "pico base stations," "femto base stations," "Home eNodeBs (HeNBs)," "Remote Radio Heads (RRHs)," "eNBs," "gNBs," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A, 5G, NR and so on, and may not be limited to mobile communication terminals, and may be stationary communication terminals. Furthermore, the user terminals 20 can perform device-to-device (D2D) communication with other user terminals 20.

In the radio communication system 1, as radio access schemes, orthogonal Frequency Division Multiple Access (OFDMA) can be applied to the downlink (DL), and Single-Carrier Frequency Division Multiple Access (SC-FDMA) can be applied to the uplink (UL). OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminal s to use mutually different bands. Note that the uplink and downlink radio access schemes are not limited to the combination of these, and OFDMA may be used in the UL.

Also, in the radio communication system 1, a multi-carrier waveform (for example, OFDM waveform) or a single-carrier waveform (for example, DFT-s-OFDM waveform) may be used.

In the radio communication system 1, a DL shared channel (Physical Downlink Shared CHannel (PDSCH), also referred to as a "DL data channel" or the like), which is shared by each user terminal 20, a broadcast channel (Physical Broadcast CHannel (PBCH)), downlink L1/L2 control channels and so on are used as DL channels. At least one of user data, higher layer control information, System Information Blocks (SIBs) and so forth is communicated by the PDSCH. Also, the Master Information Block (MIB) is communicated by the PBCH.

The L1/L2 control channels include DL control channels (such as Physical Downlink Control CHannel (PDCCH), Enhanced Physical Downlink Control CHannel (EPDCCH), etc.), Physical Control Format Indicator CHannel (PC-FICH), Physical Hybrid-ARQ Indicator CHannel (PHICH) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission control information (ACK/NACK) in response to the PUSCH can be communicated in at least one of the PHICH, the PDCCH and the EPDCCH.

In the radio communication system 1, a UL shared channel (Physical Uplink Shared CHannel (PUSCH), also referred to as an "uplink shared channel" or the like), which is shared by each user terminal 20, an uplink control channel (Physical Uplink Control CHannel (PUCCH)), a random access channel (Physical Random Access CHannel (PRACH)) and so on are used as UL channels. User data, higher layer control information and so on are communicated by the PUSCH. Uplink control information (UCI), including at least one of retransmission control information (ACK/NACK) in response to DL signals, channel state information (CSI) and so on, is communicated by the PUSCH or the PUCCH. By means of the PRACH, random access preambles for establishing connections with cells can be communicated.

<Radio Base Station>

Figure 9:
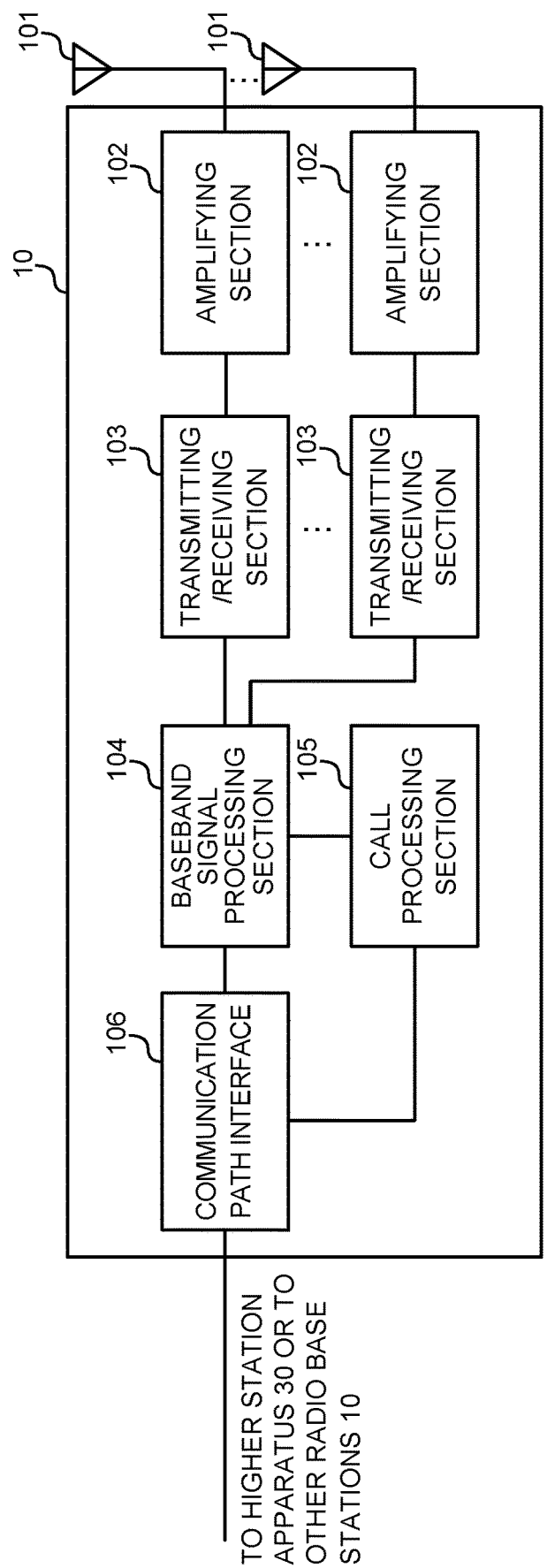
FIG. 9 is a diagram to show an exemplary overall structure of a radio base station according to the present embodiment.

FIG. 9 is a diagram to show an exemplary overall structure of a radio base station according to the present embodiment. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 in DL is input from the higher station apparatus 30, to the baseband signal processing section 104, via the communication path interface 106.

In the baseband signal processing section 104, the user data is subjected to transmission processes, including a Packet Data Convergence Protocol (PDCP) layer process, division and coupling of the user data, Radio Link Control (RLC) layer transmission processes such as RLC retransmission control, Medium Access Control (MAC) retransmission control (for example, a Hybrid Automatic Repeat reQuest (HARD) transmission process), scheduling, transport format selection, channel coding, an inverse fast Fourier transform (IFFT) process, a precoding process and so forth, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with neighboring radio base stations 10 via an inter-base station interface (which is, for example, optical fiber in compliance with the Common Public Radio Interface (CPRI), the X2 interface, etc.).

Furthermore, the transmitting/receiving sections 103 transmit DL signals (including at least one of DL data signals, DL control signals and DL reference signals) to the user terminal 20, and receive UL signals (including at least one of UL data signals, UL control signals and UL reference signals) from the user terminal 20.

Also, the transmitting/receiving sections 103 receive UCI from the user terminal 20 by using an uplink shared channel (for example, PUSCH) or an uplink control channel (for example, short PUCCH and/or long PUCCH). This UCI may include at least one of an HARQ-ACK in response to a DL data channel (for example, PDSCH), CSI, an SR, beam identification information (for example, a beam index (BI)), and a buffer status report (BSR).

Furthermore, the transmitting/receiving sections 103 may transmit CSI PUCCH resource information (resource information), which indicates a single or a number of CSI PUCCH resources (uplink control channel resources), per reporting config ID (configuration identifier) related to CSI reporting.

Figure 10:
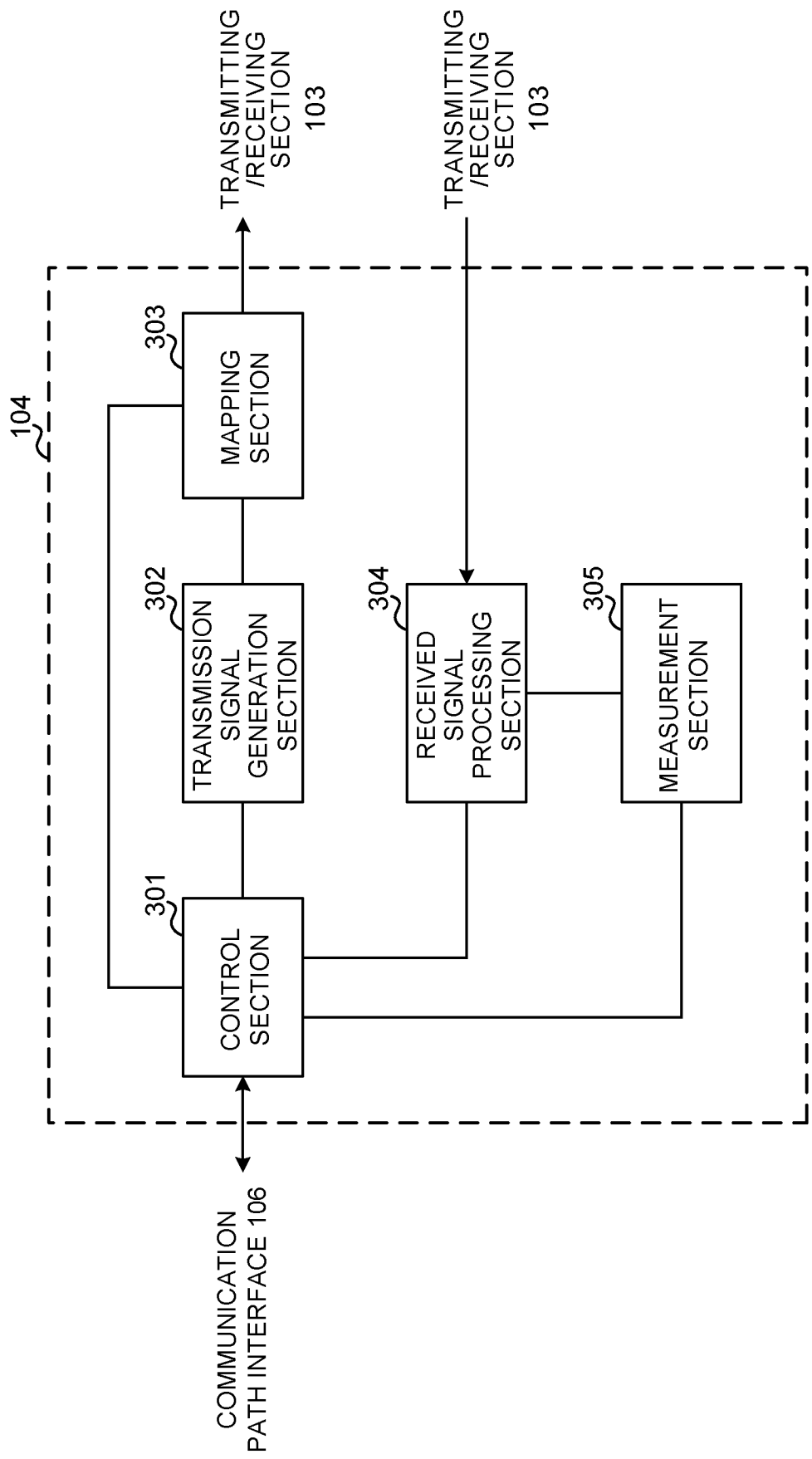
FIG. 10 is a diagram to show an exemplary functional structure of a radio base station according to the present embodiment.

FIG. 10 is a diagram to show an exemplary functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules user terminals 20. To be more specific, the control section 301 may control scheduling and/or retransmission for the DL data and/or uplink shared channels based on UCI (for example, CSI and/or BI) from the user terminals 20.

Also, the control section 301 may exert control so that the format of an uplink control channel (for example, long PUCCH and/or short PUCCH) is controlled, and control information related to this uplink control channel is transmitted.

Furthermore, the control section 301 may control the configuration of PUCCH resources. To be more specific, the control section 301 may exert control so that the user terminals are configured with CSI PUCCH resources.

Furthermore, the control section 301 may control the generation and/or transmission of measurement config information that includes one or more pieces of reporting config information.

The control section 301 may control the received signal processing section 304 to perform receiving processes for the UCI from the user terminal 20 based on the format of the uplink control channel.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) as commanded by the control section 301, and outputs these signals to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signal generated in the transmission signal generation section 302 to a radio resource, as commanded by the control section 301, and outputs this to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may output the received signals, the signals after the receiving processes and so on, to the measurement section 305. In addition, the received signal processing section 304 performs UCI receiving processes based on the uplink control channel format specified by the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, Reference Signal Received Power (RSRP)) and/or the received quality (for example, Reference Signal Received Quality (RSRQ)) of UL reference signals. The measurement results may be output to the control section 301.

<User Terminal>

Figure 11:
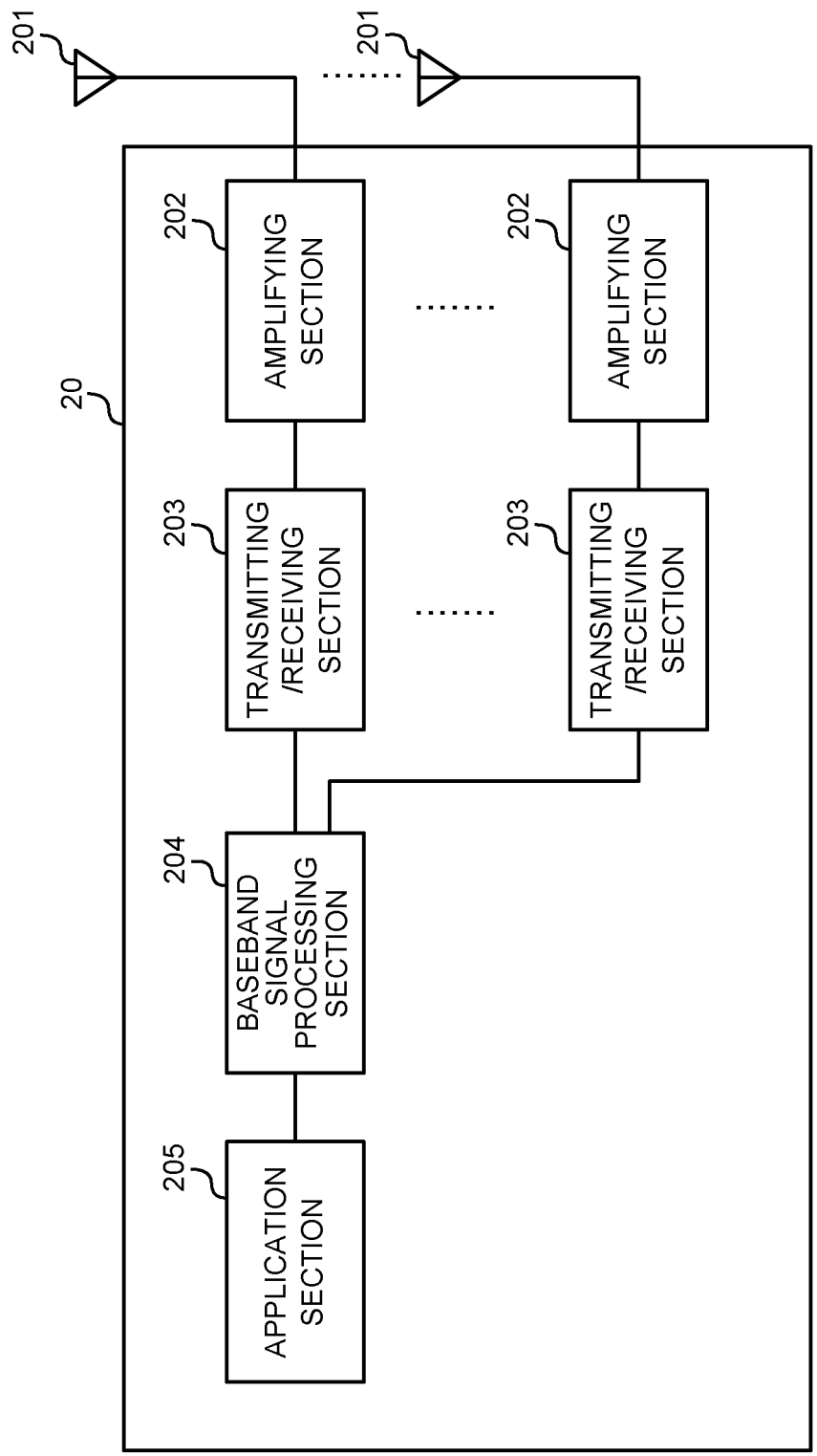
FIG. 11 is a diagram to show an exemplary overall structure of a user terminal according to the present embodiment.

FIG. 11 is a diagram to show an exemplary overall structure of a user terminal according to the present embodiment. A user terminal 20 has a number of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI is also subjected to at least one of channel coding, rate matching, puncturing, a DFT process and an IFFT process, and the result is forwarded to each transmitting/receiving section 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive DL signals (including DL data signals, DL control signals (DCI) and DL reference signals) of the numerologies configured in the user terminal 20, and transmit UL signals (including UL data signals, UL control signals and UL reference signals) of these numerologies.

Also, the transmitting/receiving sections 203 transmit UCI, including CSI, to the radio base station 10, by using an uplink shared channel (for example, PUSCH) or an uplink control channel (for example, short PUCCH and/or long PUCCH).

Furthermore, the transmitting/receiving sections 203 may receive CSI PUCCH resource information (resource information), which indicates a single or a number of CSI PUCCH resources (uplink control channel resources), per reporting config ID (configuration identifier) related to CSI reporting.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving sections 203 may be structured as one transmitting/receiving section, or may be formed with a transmitting section and a receiving section.

Figure 12:
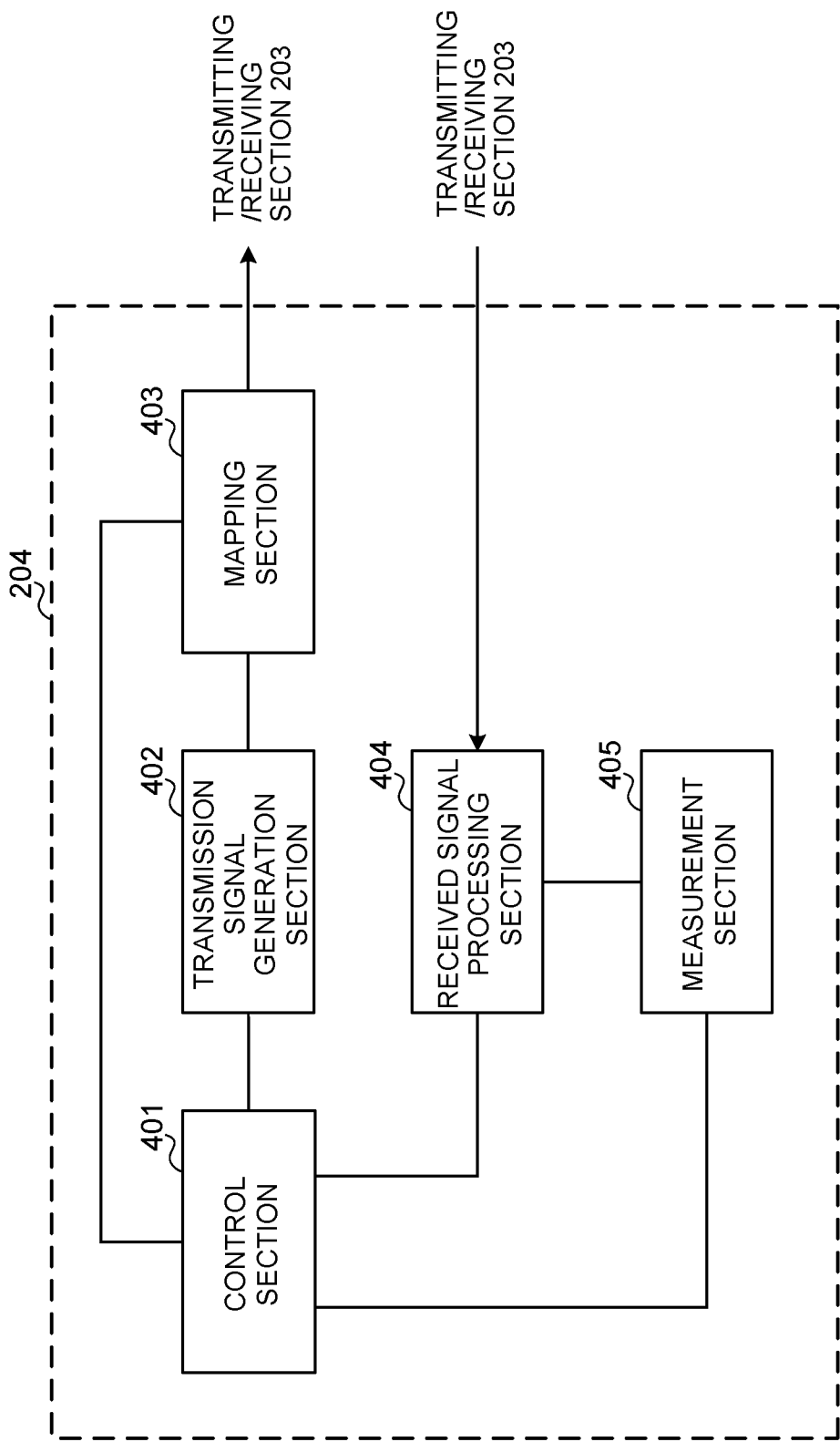
FIG. 12 is a diagram to show an exemplary functional structure of a user terminal according to the present embodiment.
Figure 13:
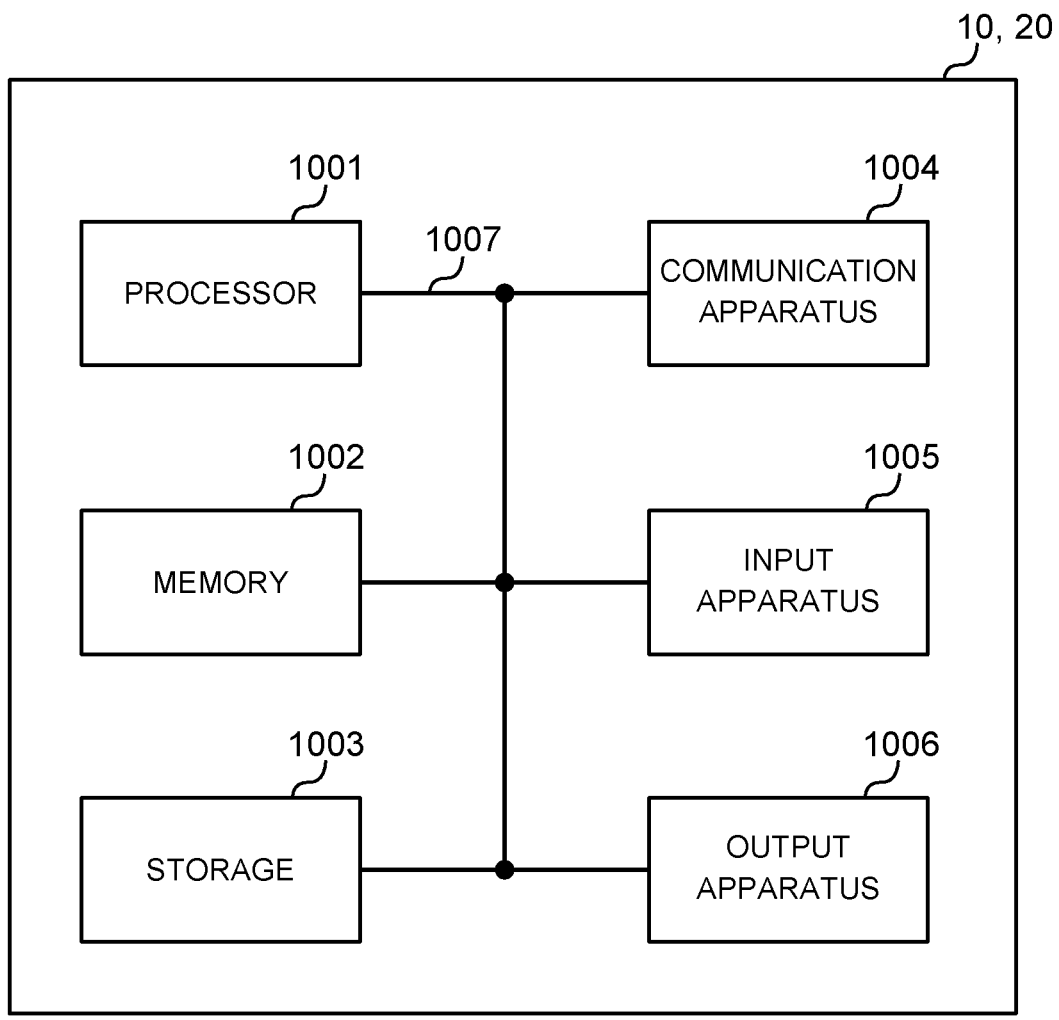
FIG. 13 is a diagram to show an exemplary hardware structure of a radio base station and a user terminal according to the present embodiment.

FIG. 12 is a diagram to show an exemplary functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generation section 402, a mapping section 403, a received signal processing section 404, and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

Also, the control section 401 may select a single multi-CSI PUCCH resource (uplink control channel resource) to use to transmit a number of CSIs, based on CSI PUCCH resource information (resource information) reported from the radio base station 10.

These CSIs may be associated with a number of CSI PUCCH resources (uplink control channel resources) that correspond to different reporting config IDs (configuration identifiers) (first example). When these CSI PUCCH resources collide, the control section 301 may select a single multi-CSI PUCCH resource from these CSI PUCCH resources.

The control section 301 may select a single multi-CSI PUCCH resource, from the CSI PUCCH resources, based on at least one of the capacities and starting symbols of these CSI PUCCH resources, and the priorities of these CSIs (based on, for example, rule 1 or rule 2).

Furthermore, a number of CSIs above may be associated with a number of CSI PUCCH resources that correspond to the same or different reporting config IDs (second example). When these CSI PUCCH resources collide, the control section 301 may select a multi-CSI PUCCH resource to use to transmit these CSIs, from the CSI PUCCH resources.

The control section may select the multi-CSI PUCCH resource to use to transmit the CSIs from the CSI PUCCH resources, based on at least one of the resource types, capacities, and starting symbols of these CSI PUCCH resources, and the priorities of these CSIs (based on, for example, rule 3 or rule 4).

For the control section 401, a controller, a control circuit or control apparatus that can be described based on general understanding of the technical field to which the present invention pertains can be used.

In the transmission signal generation section 402, UL signals (including UL data signals, UL control signals, UL reference signals, UCI, etc.) are generated (including, for example, encoding, rate matching, puncturing, modulation, etc.) as commanded by the control section 401, and output to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources as commanded by the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiment show blocks in functional units. These functional blocks (components) may be implemented in arbitrary combinations of hardware and/or software. Also, the method for implementing each functional block is not particularly limited. That is, each functional block may b e realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

For example, the radio base station, user terminals and so on according to one embodiment of the present invention may function as a computer that executes the processes of the radio communication method of the present invention. FIG. 20 is a diagram to show an exemplary hardware structure of a radio base station and a user terminal according to one embodiment of the present invention.

Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. The hardware structure of a radio base station 10 and a user terminal 20 may be designed to include one or more of each apparatus shown in the drawings, or may be designed not to include part of the apparatus.

For example, although only one processor 1001 is shown, a number of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so forth from the storage 1003 and/or the communication apparatus 1004, into the memory 1002, and executes various processes according to these. As for the programs, programs to allow computers to execute at least part of the operations of the above-described embodiment may be used. For example, the control section 401 of a user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)," and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured in include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, a Light Emitting Diode (LED) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an Application-Specific Integrated Circuit (ASIC), a Programmable Logic Device (PLD), a Field Programmable Gate Array (FPGA) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a signal may be a message. A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or more slots in the time domain. A subframe may be a fixed time duration (for example, 1 ms), which does not depend on numerology.

Furthermore, a slot may be comprised of one or more symbols in the time domain (Orthogonal Frequency Division Multiplexing (OFDM) symbols, Single Carrier Frequency Division Multiple Access (SC-FDMA) symbols, and so on). Also, a slot may be a time unit based on numerology. Also, a slot may include a number of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a number of contiguous subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

A TTI may be the transmission time unit of channel-encoded data packets (transport blocks), code blocks and/or codewords, or may be the unit of processing in scheduling, link adaptation, and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a number of contiguous subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (Physical RB (PRB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs), and so on can be variously changed.

Also, the information and parameters described in this specification may be represented in absolute values or in relative values with respect to given values, or may be represented using other applicable information. For example, a radio resource may be indicated by a given index.

The names used for parameters and so on in this specification are in no respect limiting. For example, since various channels (Physical Uplink Control CHannel (PUCCH), Physical Downlink Control CHannel (PDCCH) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a number of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The method of reporting information is by no means limited to those used in the examples/embodiments described in this specification, and other methods may be used as well. For example, reporting of information may be implemented by using physical layer signaling (for example, downlink control information (DCI), uplink control information (UCI)), higher layer signaling (for example, Radio Resource Control (RRC) signaling, broadcast information (the master information block (MIB), system information blocks (SIBs) and so on), Medium Access Control (MAC) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, or by reporting another piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," a "NodeB," an "eNodeB (eNB)," an "access point," a "transmission point," a "receiving point," a "transmitting/receiving point," a "femto cell," a "small cell," and so on.

A base station can accommodate one or more (for example, three) cells (also referred to as "sectors"). When a base station accommodates a number of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably.

A mobile station may be referred to as a "subscriber station," a "mobile unit," a "subscriber unit," a "wireless unit," a "remote unit," a "mobile device," a "wireless device," a "wireless communication device," a "remote device," a "mobile subscriber station," a "access terminal," a "mobile terminal," a "wireless terminal," a "remote terminal," a "handset," a "user agent," a "mobile client," a "client," or some other suitable terms.

A base station and/or a mobile station may be referred to as "transmitting apparatus," "receiving apparatus," and the like.

Furthermore, the radio base stations in this specification may be interpreted as user terminals. For example, each example/embodiment of the present invention may be applied to a configuration in which communication between a radio base station and a user terminal is replaced with communication among a number of user terminals (Device-to-Device (D2D)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, Mobility Management Entities (MMEs), Serving-Gateways (S-GWs), and so on may be possible, but these are not limiting) other than base stations, or combinations of these.

The examples/embodiments illustrated in this specification may be used individually or in combinations, which may be switched depending on the mode of implementation. Also, the order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. It follows that reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used in the present disclosure may be interpreted as meaning making judgements and determinations related to receiving (for example, receiving information), transmitting (for example, transmitting information), inputting, outputting, accessing (for example, accessing data in a memory) and so on. In addition, to "judge" and "determine" as used in the present disclosure may be interpreted as meaning making judgements and determinations related to resolving, selecting, choosing, establishing, comparing, and so on. In other words, to "judge" and "determine" as used in the present disclosure may be interpreted as meaning making judgements and determinations with regard to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted likewise.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various variations, without departing from the spirit and scope of the present invention defined by the recitations of claims. Consequently, the description herein is provided only for the purpose of explaining examples, and should by no means be construed to limit the present invention in any way.

The invention claimed is:
1. A terminal comprising:
a receiver that receives information, which indicates a plurality of uplink control channel (PUCCH) resources used by a plurality of channel state information (CSI) reports, configured by higher layer signaling; and a processor that determines a single PUCCH resource, from the plurality of PUCCH resources, to be used for the plurality of CSI reports based on a capacity of each of the plurality of PUCCH resources, wherein the capacity of each of the plurality of PUCCH resources is determined based on code rates of each of the plurality of PUCCH resources.

2. The terminal according to claim 1, wherein, when the capacity of a first PUCCH resource is larger than the capacity of a second PUCCH resource among the plurality of PUCCH resources and when the second PUCCH resource is capable of transmitting all of the plurality of CSI reports, the processor determines the second PUCCH resource to be the single PUCCH resource to be used for the plurality of CSI reports, and when the second PUCCH resource is not capable of transmission all of the plurality of CSI reports, the processor determines the first PUCCH resource to be the single PUCCH resource to be used for the plurality of CSI reports.

3. A radio communication method for a terminal, comprising:

receiving information, which indicates a plurality of uplink control channel (PUCCH) resources used by a plurality of channel state information (CSI) reports, configured by higher layer signaling; and determining a single PUCCH resource, from the plurality of PUCCH resources, to be used for the plurality of CSI reports based on a capacity of each of the plurality of PUCCH resources, wherein the capacity of each of the plurality of PUCCH resources is determined based on code rates of each of the plurality of PUCCH resources.

4. A base station comprising:

a transmitter that transmits information, to a terminal, which indicates a plurality of uplink control channel (PUCCH) resources used by a plurality of channel state information (CSI) reports, by higher layer signaling; and a processor that controls to determine, in the terminal, a single PUCCH resource, from the plurality of PUCCH resources, to be used for the plurality of CSI reports based on a capacity of each of the plurality of PUCCH resources, wherein the capacity of each of the plurality of PUCCH resources is determined based on code rates of each of the plurality of PUCCH resources.

5. A system comprising a base station and a terminal, wherein:

the base station comprises:

a transmitter that transmits information, to the terminal, which indicates a plurality of uplink control channel (PUCCH) resources used by a plurality of channel state information (CSI) reports, by higher layer signaling, and the terminal comprises:

a receiver that receives the information; and a processor that determines a single PUCCH resource, from the plurality of PUCCH resources, to be used for the plurality of CSI reports based on a capacity of each of the plurality of PUCCH resources, wherein the capacity of each of the plurality of PUCCH resources is determined based on code rates of each of the plurality of PUCCH resources.

* * * * *